(12) United States Patent
Aasberg-Petersen et al.

(10) Patent No.: US 6,730,285 B2
(45) Date of Patent: May 4, 2004

(54) PRODUCTION OF HYDROGEN AND CARBON MONOXIDE CONTAINING SYNTHESIS GAS BY PARTIAL OXIDATION

(75) Inventors: Kim Aasberg-Petersen, Holte (DK); Thomas Sandahl Christensen, Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 392 days.

(21) Appl. No.: 09/955,455

(22) Filed: Sep. 18, 2001

(65) Prior Publication Data

US 2002/0058005 A1 May 16, 2002

(30) Foreign Application Priority Data

Sep. 18, 2000 (DK) ........................................ 2000 01383

(51) Int. Cl.⁷ .................................................. C01B 3/26
(52) U.S. Cl. ..................... 423/652; 423/418.2; 252/373
(58) Field of Search ....................... 252/373; 423/418.2, 423/650, 651, 652

(56) References Cited

U.S. PATENT DOCUMENTS

| | | | |
|---|---|---|---|
| 4,048,091 A | * 9/1977 | Barnaba | ................ 48/197 FM |
| 5,628,931 A | 5/1997 | Lednor et al. | |
| 5,883,138 A | 3/1999 | Hershkowitz et al. | |

FOREIGN PATENT DOCUMENTS

| | | |
|---|---|---|
| EP | 0 330 751 A2 | 9/1989 |
| EP | 0 824 894 A1 | 5/1998 |
| EP | 0 936 183 | 8/1999 |
| EP | 0 984 500 A2 | 3/2000 |
| GB | 2 274 284 A | 7/1994 |

* cited by examiner

*Primary Examiner*—Stanley S. Silverman
*Assistant Examiner*—Maribel Medina
(74) *Attorney, Agent, or Firm*—Dickstein Shapiro Morin & Oshinsky, LLP

(57) ABSTRACT

A process for the preparation of a synthesis gas containing hydrogen and carbon monoxide by a combination of catalytic partial oxidation and further an autothermal reforming process, comprising (a) providing separate streams of predetermined proportions of a hydrocarbon feedstock, an oxygen source and of process steam, (b) injecting said separate streams into a catalytic partial oxidation reaction zone to react, and to form a prereformed product stream, (c) introducing the prereformed product and a predetermined proportion of a second oxygen source into a further partial oxidation process step forming a further partially oxidised process stream by flame reactions, (d) reacting the further partially oxidised process stream in the reaction zone constituting a steam reforming process step to form a synthesis gas product stream, and (e) withdrawing the synthesis gas product stream from the further partial oxidation process step and the steam reforming process step, the two steps constituting the autothermal reforming process.

5 Claims, No Drawings

PRODUCTION OF HYDROGEN AND CARBON MONOXIDE CONTAINING SYNTHESIS GAS BY PARTIAL OXIDATION

This invention relates to a process for the production of synthesis gas from a hydrocarbon feed.

More specifically it concerns a novel favourable combination of reforming technologies involving catalytic partial oxidation which allows for the preparation of synthesis gas from a hydrocarbon stream with process improvements. The hydrocarbon stream such as methane, natural gas, butane, LPG or naphtha may further contain other components such as $H_2$, $CO$, $CO_2$, $N_2$, $NH_3$, $HCN$, inorganic or organic sulphur compounds.

Amongst the known reforming technologies are gas phase partial oxidation (GPOX), various forms of steam reforming e.g. methane steam reforming (MSR), autothermal reforming (ATR) and catalytic partial oxidation (CPO). The ATR process in fact involves a sequential combination of GPOX and MSR, the CPO being a process wherein the reactions of GPOX are avoided in the gas phase and instead performed on the surface of the highly active catalyst by which the steam reforming reactions (incl. MSR) are conducted simultaneously.

The catalytic partial oxidation reactor comprises a mixing zone, where the hydrocarbon feedstock and steam admixture is further mixed with the oxidant and a catalytic zone where the feedstock admixture is reacted according to the main reaction schemes (hydrocarbons represented as methane in the schemes):

$$CH_4 + \tfrac{1}{2}O_2 \rightarrow CO + 2H_2$$

$$CH_4 + 2O_2 \rightarrow CO_2 + 2H_2O$$

$$2H_2 + O_2 \rightarrow 2H_2O$$

$$CH_4 + H_2O \leftrightarrow CO + 3H_2 \text{(MSR)}$$

$$CO + H_2O \leftrightarrow CO_2 + H_2 \text{(shift)}$$

All higher hydrocarbons are converted in the CPO. The exit gas from the CPO reactor contains hydrogen, carbon monoxide, carbon dioxide, methane and steam in amounts such that the MSR and shift reactions are close to equilibrium. Thus, basically the same reactions occur in a CPO reactor as in an ATR reactor, only the reactions in a CPO reactor occur simultaneously and catalytically over the catalyst bed.

Characteristic of CPO is that it may be run soot-free at a low steam to carbon ratio and in some cases even without steam addition.

In order to avoid the risk of flames, the inlet temperature to the CPO reactor must be rather low compared to the inlet temperatures to an ATR. The maximum preheat temperature depends among other parameters on the actual oxygen to hydrocarbon ratio (as molar ratio of $O_2$/total content of carbon from hydrocarbons), and the steam to carbon ratio (molar ratio of $H_2O$/total content of carbon from hydrocarbons). The molar content of carbon is calculated as the molar content of the hydrocarbon times the carbon contents of the hydrocarbon.

A high conversion of the hydrocarbon (low methane leakage) is only attained if the temperature is raised sufficiently through the reactor.

The need for a high exit temperature implies the requirement of a high oxygen to carbon ratio of the feed streams, typically 0.5–0.90, which disadvantageously leads to a high consumption of oxidant and thus a high production cost.

According to U.S. Pat. No. 5,883,138 gas phase oxidation reactions can be avoided even with premixed feed at high temperature, if the gas mixture in the mixing zone is passed before a maximum residence time (most preferably less than 0.5 milliseconds) and at a high velocity (most preferably between 50 and 300 ft/sec) into a CPO reaction zone. The methods of a reduced delay time are insecure and running the CPO process according to this principle represents a major risk of explosion.

The catalyst in a CPO reactor often contains one or more noble metals (e.g. Rh, Ir, Pt, Pd). The catalyst may comprise nickel and cobalt as catalytic components for some CPO uses, and may further comprise noble metals. Another drawback in the CPO reforming technology is that when the oxygen to carbon ratio is high, the temperature on surface of the catalyst becomes as high as 1100–1300° C., which leads to the detrimental sintering of the catalyst.

Thus, a general object of this invention is to provide a CPO process being operated at low oxygen consumption and without the safety risks of running the process under conditions where the premixture is explosive.

As known in the autothermal reforming, combustion of hydrocarbon feed mixed with steam is carried out with substoichiometric amounts of oxygen by flame reactions in a burner combustion zone. The oxygen source may be any oxygen containing stream (hereinafter oxidant) such as pure oxygen, air or mixtures thereof. If the hydrocarbons are represented by methane, the reaction schemes are:

$$CH_4 + \tfrac{1}{2}O_2 \rightarrow CO + 2H_2$$

$$CH_4 + 2O_2 \rightarrow CO_2 + 2H_2O$$

$$2H_2 + O_2 \rightarrow 2H_2O$$

Subsequently, the partially combusted hydrocarbon stream is steam reformed in a fixed bed of steam reforming catalyst, according to the following reaction schemes.

$$CH_4 + H_2O \leftrightarrow CO + 3H_2 \text{(MSR)}$$

$$CO + H_2O \leftrightarrow CO_2 + H_2 \text{(Shift)}$$

Substoichiometric combustion of hydrocarbons may disadvantageously lead to the formation of soot. Soot formation may though be avoided by using a specific burner design and through controlling the operating conditions.

E.g. soot can be avoided if the amount of steam relative to the other components send to the autothermal reformer is above a critical value. The limiting amount of steam can be expressed as the critical steam to carbon ratio, which is the molar feed flow rate of steam to the molar flow rate of carbon in the hydrocarbon feed.

Examples of operation conditions, which do not result in soot formation, are summarised in the patent application EP 936,183 Peter Seier Christensen et al. Further, it was found by the inventors that a hydrocarbon feed can be reformed soot free in an autothermal reformer at a given temperature and a given steam to carbon ratio if the operating pressure is increased above a critical value.

It is also known from the U.S. Pat. No. 5,628,931 that the autothermal process can be run soot-free at a low steam to carbon ratio or even in the absence of steam, wherein the reformed product stream has a temperature in the range from 1100° C.–1300° C.

The amount of steam added to the ATR process and the temperature of the reformed product, which exits the autothermal reformer, are some of the main factors which decide the composition of the synthesis gas obtained by the autothermal reforming process. Typically, the exit temperature is above 700° C., e.g. 900–1100° C., and the oxygen content in the oxidant stream relative to the carbon content in the hydrocarbon feedstock is between 0.4 and 0.9.

In many cases the amount of steam required in order to eliminate the risk of soot formation is higher than the amount of water desired as to achieving a specific synthesis gas composition down stream the autothermal reformer. Such cases are e.g. synthesis gas applications related to methanol or methanol derivatives, Fischer-Tropsch process, olefins, alcohols and aldehydes.

A low steam to carbon ratio is typically requested to decrease the process costs.

However, it may not be attractive to increase the pressure or the exit temperature of the process in order to eliminate soot formation.

An increment of the operating pressure inherently leads to an increased concentration of methane in the product gas, especially at low steam to carbon ratio. Further, it involves the need for further compression of the oxygen source and of the availability of process steam at a higher pressure. A higher pressure of the synthesis gas delivered by the ATR process should preferably be a benefit to the downstream process, which receives the synthesis gas, in order to justify the choice of a higher operating pressure of the ATR. In parallel the increase of the methane concentration in the synthesis gas should not constitute too much of a drawback to the down-stream process.

The temperature of the product gas is a function of the preheating temperatures of the individual feed streams, the individual amounts of these streams and the degree of conversion. There are practical limits to the preheating temperatures of the feeds, and the current reactions are literally brought into equilibrium, meaning that if the temperature of the reformed product is to be as high as 1100° C.–1300° C., the oxygen expenses are disadvantageously increased.

Thus, another general object of this invention is to provide an autothermal reforming process, which can be operated soot-free at low/moderate pressures, without the increased need of steam or oxygen.

In general in partial oxidation processes there is a wish to obtain certain product gas compositions useful for a given backend product, e.g. carbon monoxide or hydrogen, or process, e.g. Fischer-Tropsch, methanol or DME synthesis, without having by-products such as soot. The group of partial oxidation processes comprises ATR, GPOX and partial oxidation by means of a membrane, in which the oxidant is supplied through a membrane to the reaction zone. For all partial oxidation processes the parameters determining the product composition are the reactor pressure, the steam to carbon ratio and the product exit temperature controlled by the inlet temperature of the individual feeds and the amount of oxidant added.

It has now been found that when partly or fully processing a hydrocarbon feedstock in a catalytic partial oxidation (CPO) reactor, the partially oxidised (prereformed) hydrocarbon feedstock may then be reformed at improved conditions in a subsequent reforming step. E.g. the partially oxidised hydrocarbon can be processed soot free in an autothermal reformer at a lower steam to carbon ratio than normally applied. Without wishing to be bound to any theory the inventors suggest that the soot formation in the ATR depends on the content of hydrocarbons in the feedstock especially higher hydrocarbons, in particular olefins, whereas carbon monoxide and carbon dioxide will not form soot. Having the feed processed in a CPO reactor the composition of the gas is converted to $CO$, $CO_2$, $H_2$, $H_2O$ and $CH_4$. This feedstock will have a much lower critical soot value than the original feedstock, and therefore it is possible to lower the steam to carbon ratio or to operate at a lower pressure at a constant steam to carbon ratio.

When the CPO reactor is used in combination with another reforming technology in the present invention, new operating conditions are advantageously applied to the CPO. As further an advantage, the oxygen consumption can be reduced, as the methane leakage exit the CPO is allowed to be high, the methane being converted in the reforming process following the CPO. With the reduction in oxygen is obtained the reduced sintering of the catalyst and the reduced risk of detonation/flames in the inlet zone of the CPO reactor.

With the invention is provided, i.e. with the novel combination of the CPO reactor and a partial oxidation reactor, a kind of soot guard of the subsequent partial oxidation reforming technology in combination with the CPO reactor. The synthesis gas exiting the partial oxidation reactor of the present invention is soot-free, however, similar in composition to a synthesis gas at the exit of a conventional partial oxidation reactor fed directly with the hydrocarbon feed at conditions which lead to soot formation.

Yet another advantage of the present invention is that the preheat temperatures of the individual streams of hydrocarbon and oxidant are considerably lower than what is typically applied for partial oxidation reactor alone. The lower preheat temperatures lead to a reduced need of heating duty, the allowance of a lower temperature level of the heating medium, and lower demands on the construction materials for the respective heaters, and for oxygen services, lower risk of rupture.

In another aspect of the present invention it provides for a postconverter (partial oxidation reactor) of a CPO, eliminating current technological problems with CPO, as mentioned.

This aspect of the invention is fulfilled as long as, given soot free operation, the ratio of the oxygen/hydrocarbon at the inlet to the CPO reactor in the combined layout is less than in the inlet to a CPO based plant; i.e:

$$(O_2/C)_{CPO\ COMBI\ INLET} < (O_2/C)_{CPO\ INLET}$$

The following Examples 2–4 serve to demonstrate specific embodiments of the present invention for the purpose of comparison to known technology demonstrated in Comparative Examples 1 and 5.

For all examples below a pressure of 18.44 kg/cm² g, a $O_2/C=0.58$ (i.e. the molar ratio of total oxygen to the total content of carbon from hydrocarbons), and an inlet temperature of the oxygen of 220° C. has been applied.

COMPARATIVE EXAMPLE 1

100 Nm³/h of natural gas with the composition

| Composition of Natural Gas | |
|---|---|
| Component | Mole Fraction % |
| $N_2$ | 0.45 |
| $CO_2$ | 1.20 |
| $CH_4$ | 95.36 |
| $C_2H_6$ | 2.22 |
| $C_3H_8$ | 0.45 |
| $C_4H_{10}$ | 0.23 |
| $C_5H_{12}$ | 0.08 |
| And higher hydrocarbons | | was passed to a CPO reactor at 200° C. with a steam to carbon ratio of 0.2 i.e. the molar ratio of steam to the total content of carbon from hydrocarbons.

The reformed effluent had a temperature of 1033° C., a $H_2/CO$ of 2.02 and a production of CO of 91.0 $Nm^3/h$.

EXAMPLE 2

Example 1 was repeated, but the CPO reactor was followed by an ATR reactor, i.e. the first reformed effluent was sent without heating or cooling to an ATR, and 50% of the oxygen feed to the CPO reactor in Example 1 was by-passed the CPO reactor and directed to the ATR.

The first reformed effluent had a temperature of 798° C. The final reformed effluent had a temperature of 1033° C., a $H_2/CO$ ratio of 2.02 and a production of CO of 91.0 $Nm^3/h$.

EXAMPLE 3

Example 2 was repeated but the amount of oxygen sent to the CPO and the ATR, respectively, was split 30%/70%. The first reformed effluent had a temperature of 705° C. The final reformed effluent had a temperature of 1033° C., a $H_2/CO$ ratio of 2.02 and a production of CO of 91.0 $Nm^3/h$.

EXAMPLE 4

Example 3 was repeated, but the temperature of the natural gas and steam mixture fed to the CPO reactor was raised from 200° C. to 400° C.

The first reformed effluent had a temperature of 738° C. The final reformed effluent had a temperature of 1095° C., a $H_2/CO$ ratio of 2.00 and a production of CO of 94.3 $Nm^3/h$.

COMPARATIVE EXAMPLE 5

The same natural gas composition and flow rate was used, but passed to an autothermal reformer at a temperature of 500° C. and with a steam to carbon ratio of 0.96, being the minimum steam to carbon ratio allowed in order to avoid the formation of soot.

The effluent had a temperature of 1024° C., a $H_2/CO$ ratio of 2.51 and a production of CO of 81 $Nm^3/h$.

For an easy overview, the results of Examples 1–5 have been presented in Table 2.

TABLE 2

| Case | 1 | 2 | 3 | 4 | 5 |
|---|---|---|---|---|---|
| Layout | CPO | CPO + ATR | CPO + ATR | CPO + ATR | ATR |
| S/C [mole/mole] | 0.20 | 0.20 | 0.20 | 0.20 | 0.96 |
| $T_{in, CPO}$, nat. gas [° C.] | 200 | 200 | 200 | 400 | — |
| Fraction of $O_2$ fed to CPO [%] | 100 | 50 | 30 | 30 | — |
| $T_{out, CPO}$ [° C.] | 1033 | 798 | 705 | 738 | — |
| $T_{out, ATR}$ [° C.] | — | 1033 | 1033 | 1095 | 1024 |
| H2/CO | 2.02 | 2.02 | 2.02 | 2.00 | 2.51 |
| CO production [$Nm^3/h$] | 91.0 | 91.0 | 91.0 | 94.3 | 81.0 |
| $(O_2/C)_{in, CPO}$ | 0.58 | 0.29 | 0.174 | 0.174 | — |

The processes of combined CPO and ATR in Examples 2, 3 and 4 have the following advantages over the CPO reactor in Example 1.

It is known that in a CPO reactor the process is conducted as a partial combustion in the top part of the catalyst bed followed by combined partial oxidation and steam reforming reactions in the lower part. This leads to excessive temperatures in the top part of the catalyst bed, leading to sintering and shortening of catalyst lifetime.

If the oxygen to hydrocarbon ratio is reduced, the temperature on the surface of the catalyst is reduced as well.

Furthermore, oxygen/hydrocarbon mixtures are inflammable. With reduced $O_2/C$ ratios the inflammability tendency is also reduced. This is known in the art, and it has been established by investigation as well in an experimental study performed by the inventors at the University of Wales. Ignition experiments were carried out on mixtures of methane, ethane and oxygen in a vessel at an initial pressure from atmospheric pressure up to 7 bar, with the feeds being preheated to temperatures between 0 and 260° C. and with an oxygen to carbon ratio in the range from 0.50 to 1.22.

As can be seen from the above table the advantages of the processes of Examples 2–4 compared to Example 5 are numerous. Amongst others a low $H_2/CO$ ratio which is often aimed at in autothermal reformer applications, a reduced steam consumption, which again means a reduced flow rate through the synthesis gas preparation section and smaller equipment sizes, a reduced preheating duty and a larger production of CO.

In Example 4, the preheating temperature has been increased, which increases the CO production. This would not be a secure approach in a typical CPO reactor, but can be allowed in Example 4 because of the strongly reduced oxygen content in the feed to the CPO reactor.

The above examples are specific embodiments of the present invention. Other feeds to the combined CPO and partial oxidation reactor could be split as well, e.g. the hydrocarbon could be split into a first and a second feed stream and likewise the steam could be added in two portions.

What is claimed is:

1. A process for the preparation of a synthesis gas containing hydrogen and carbon monoxide by a combination of catalytic partial oxidation and further an autothermal reforming process, comprising
    (a) providing separate streams of predetermined proportions of a hydrocarbon feedstock, an oxygen source and of process steam,
    (b) injecting said separate streams into a catalytic partial oxidation reaction zone to react, and to form a prereformed product stream,
    (c) introducing the prereformed product and a predetermined proportion of a second oxygen source into a further partial oxidation process step forming a further partially oxidised process stream by flame reactions,
    (d) reacting the further partially oxidised process stream in the reaction zone constituting a steam reforming process step to form a synthesis gas product stream, and
    (e) withdrawing the synthesis gas product stream from the further partial oxidation process step and the steam reforming process step, the two steps constituting the autothermal reforming process.

2. A process according to claim 1, wherein further stream(s) of hydrocarbon and/or steam is injected at predetermined proportion to the second step of partial oxidation.

3. A process according to claim 2, wherein the amount of carbon in the second stream of hydrocarbon is not higher than 30% of the total of carbon fed to the further partial oxidation process step in step c.

4. A process according to claim 1, wherein the operation pressure is between 5 and 30 bar, the $O_2/C$ inlet the process step of catalytic partial oxidation is between 0.5 and 0.9 and the steam to carbon ratio inlet the process step of catalytic partial oxidation is between 0 and 3.

5. A process according to claim 1, wherein the operation pressure is between 10 and 30 bar, the $O_2/C$ inlet the process step of catalytic partial oxidation is between 0.55 and 0.7 and the steam to carbon ratio inlet the process step of catalytic partial oxidation is between 0.2 and 1.5.

* * * * *